(12) United States Patent
Shimizu (10) Patent No.: US 7,130,135 B2
(45) Date of Patent: Oct. 31, 2006

(54) LENS HOLDING JIG

(75) Inventor: Hiroshi Shimizu, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 45 days.

(21) Appl. No.: 10/523,411

(22) PCT Filed: Aug. 1, 2003

(86) PCT No.: PCT/JP03/09800

§ 371 (c)(1),
(2), (4) Date: Feb. 3, 2005

(87) PCT Pub. No.: WO2004/012873

PCT Pub. Date: Feb. 12, 2004

(65) Prior Publication Data

US 2005/0254148 A1    Nov. 17, 2005

(30) Foreign Application Priority Data

Aug. 6, 2002  (JP) ............................ 2002-228441
Jan. 15, 2003  (JP) ............................ 2003-007223
Jul. 28, 2003  (JP) ............................ 2003-280810

(51) Int. Cl.
G02B 7/02    (2006.01)
(52) U.S. Cl. ...................... 359/819; 359/811
(58) Field of Classification Search ............. 359/811, 359/819, 820; 118/500, 501, 503, 301; 427/162, 427/164, 169
See application file for complete search history.

(56) References Cited

U.S. PATENT DOCUMENTS 6,387,183 B1 *   5/2002   Inaba et al. ................. 118/301
6,387,441 B1 *   5/2002   Yang et al. ................. 427/164
6,884,292 B1 *   4/2005   Yang et al. ................. 118/500
2002/0086103 A1  7/2002   Yang et al.

FOREIGN PATENT DOCUMENTS

| JP | 113234/1981 | 2/1983 |
| JP | 3-195021 A | 8/1991 |
| JP | 2001/311914 A | 11/2001 |
| JP | 2003-71650 | 3/2003 |

* cited by examiner

Primary Examiner—Loha Ben
(74) Attorney, Agent, or Firm—Sughrue Mion, PLLC (57) ABSTRACT

A lens holding jig used for immersing a lens (L) in a liquid by holding the lens (L) at at least three positions that are side holding portions (41, 42) for holding both left and right edges of the lens (L), and at a lower-side holding portion (43) for holding the lower edge of the lens (L). The jig is structured such that the side holding portions (41, 42) each have a letter V-shaped holding portion (404) for holding the edge of the lens and have a vertically extending portion (403) extending downward from the V-shaped holding portion (404) along the edge of the lens (L). Further, a lower-side holding portion (1) is structured so as to have a support plate (11) having at its upper end a cut-out portion (110) for supporting an end edge of a lens (L2), and an auxiliary plate (12) formed in one piece with the support plate (11) at an intersection angle. The jig can reduce as much as possible the occurrence of appearance defect of a lens at the side holding portions for supporting the sides of a lens and at the lower-side holding portion for supporting the lower side of the lens.

10 Claims, 11 Drawing Sheets

LENS HOLDING JIG

TECHNICAL FIELD

The present invention relates to a lens holding jig. More particularly, the present invention relates to a lens holding jig for use in dipping a lens in a treating solution such as a hard coating solution or the like.

BACKGROUND ART

Since plastic spectacle lenses are easily scratched, it is customary practice to coat them with an abrasion-resistant hard coating. Generally, a lens is coated with a hard coating by applying a hard coating solution to the lens surfaces of the lens and then drying the applied hard coating solution into a hard layer.

Processes of applying a hard coating to a lens include a spin-coating process and a dipping process. The dipping process is mainly relied upon for its higher productivity.

According to the conventional dipping process, lenses are mounted on a lens holding jig which is designed to hold about 30 lenses simultaneously, and then the lenses are dipped, together with the lens holding jig, in a hard coating solution. After elapse of a predetermined period of time, the lenses are pulled up and then dried while being held by the lens holding jig.

However, lens holding jigs which are capable of holding many lenses have to be available in very many types depending on the lens diameter and the lens edge thickness. The cost of a facility for keeping such lens holding jigs is high and the management of those lens holding jigs is complex.

Since a lens holding jig needs to be selected depending on the diameter and thickness of lenses to be held, it is necessary to sort lenses into small classifications, and such a sorting process is tedious and time-consuming.

A lens holding jig for holding many lenses has a framework made up of many components. When the lens holding jig is dipped in a hard coating solution, the hard coating solution is applied to those framework components. Therefore, the applied hard coating solution is wasted, and the usability of the hard coating solution is low.

Particularly, recent years have seen many customized lenses manufactured in many types and small lots, and a reduced ratio by which a lens holding jig is filled with lenses. The above problems manifest themselves under these circumstances.

The present applicant has developed a single lens holding jig for holding one lens independently of each other, as disclosed in Japanese Patent Laid-Open No. 2003-71650. An example of the single lens holding jig for holding a lens with a thin edge is shown in FIGS. 9(a), 9(b), and 9(c) of the accompanying drawings. FIG. 9(a) is a front elevational view of the single lens holding jig, FIG. 9(b) is a view showing left and right side holders which are holding a lens, and FIG. 9(c) is a view showing a lower side holder.

The single lens holding jig, denoted by 500, has a lens holder 502 for supporting and holding an edge of a single upstanding lens L, and a carrier fixture 503 to which the lens holder 502 is attached. The carrier fixture 503 is engaged and suspended by a carrier jig, not shown. The lens holder 502 has a first arm 504, a second arm 505 and a third arm 506. The first arm 504 bends at a sharp angle from a helical spring and includes a first side holder 44 on its distal end which is biased for contact with an edge of the lens by the helical spring. The second arm 505 includes a second side holder 45 for contact with an edge of the lens which is opposite to the edge of the lens engaged by the first side holder 504. The third arm 506 includes a lower side holder 46 for contact with a lower edge of the lens between the edge of the lens engaged by the first side holder 44 and the edge of the lens engaged by the second side holder 45. As shown in FIG. 9(b), each of the first side holder 44 and the second side holder 45 is in the form of a metal wire bent into a V-shaped holder for holding the edge of the lens L. The lower side holder 46 is in the form of a flat plate having a V-shaped recess for supporting the lower edge of the lens L.

Since the lens holding jig 500 is a single single lens holding jig for holding a single lens, if lens holding jigs depending on the types of lenses are made available, then lenses of many types can be held by respective lens holding jigs 500, suspended by a single carrier jig, and dipped in a hard coating solution or the like. Therefore, the single lens holding jigs are suitable for use in the manufacture of lenses in many types and small lots. Since a single lens holding jig is suspended, the amount of hard coating solution that is applied to other than the lens is small, and the usability of the hard coating solution is high. In addition, inasmuch as the lens holder 502 is allowed by the helical spring to hold lenses of different diameters, the lens holding jig 500 of one type alone is capable of holding many types of lenses regardless of different lens diameters.

Figure 9:
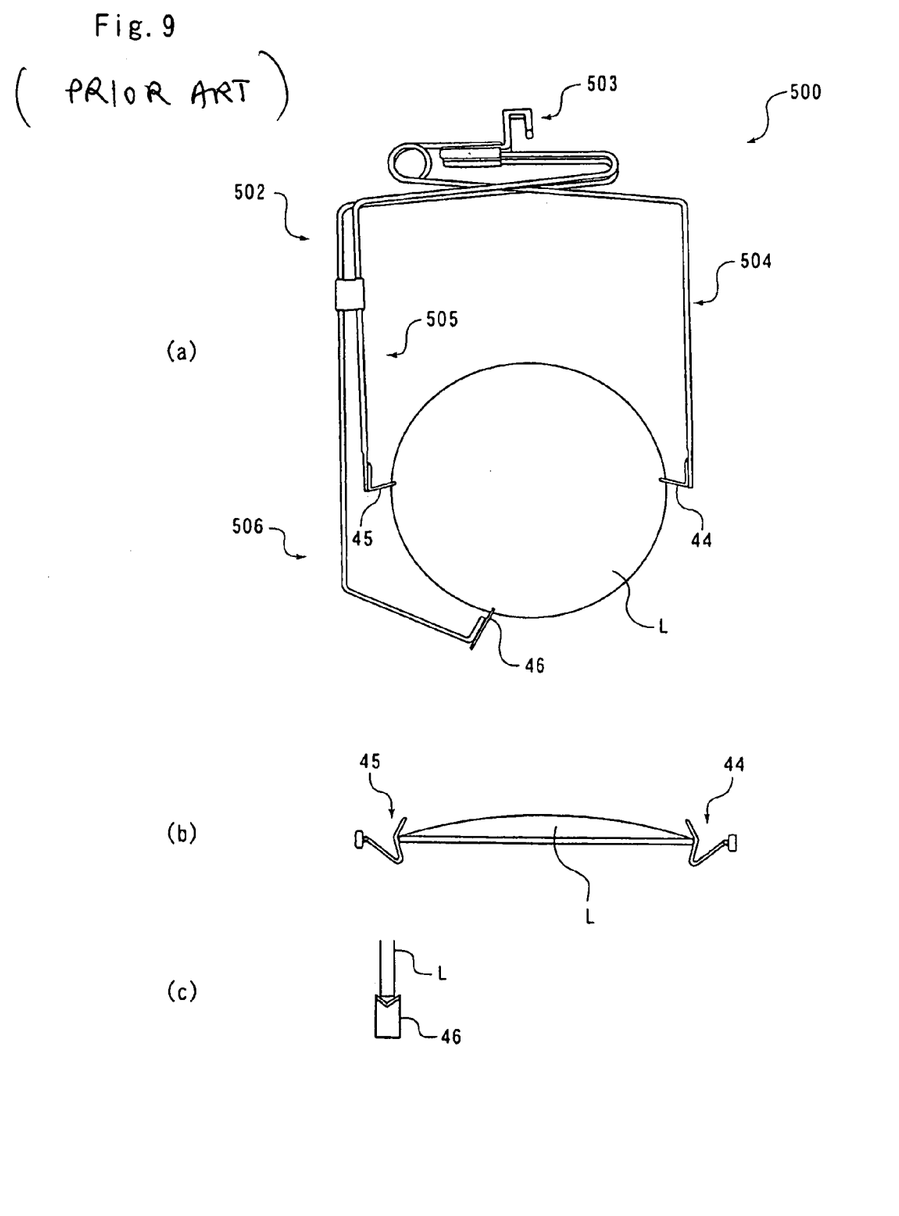
FIG. 9(a) is a front elevational view of the lens holding jig.
FIG. 9(b) is a view showing a lens held by left and right side holders of the lens holding jig.
FIG. 9(c) is a view showing a lower side holder.
Figure 10:
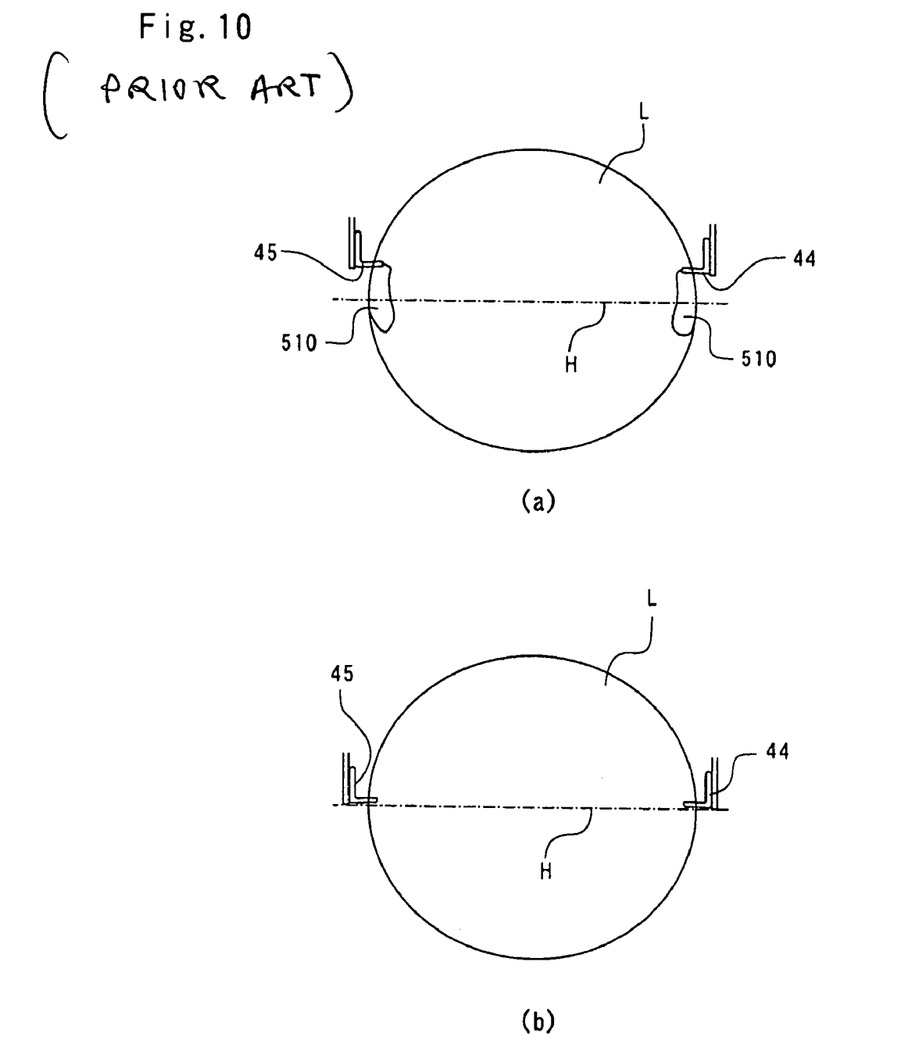
FIG. 10(a) is a view showing lens appearance defects which are developed when a hard coating is applied to a lens that is held by the conventional single lens holding jig.
FIG. 10(b) is a view illustrative of a problem caused when a countermeasure is taken to eliminate the lens appearance defects.

With the lens holding jig 500 shown in FIGS. 9(a) through 9(c), however, flow marks (thickness irregularities) 510 are produced by the hard coating solution, as shown in FIG. 10(a) of the accompanying drawings, on the surface of the lens L in those areas which are contacted by the first side holder 44 and the second side holder 45. If large thickness irregularities are produced, they tend to develop a defect in the appearance of the lens L because they are positioned in a edged lens shape that is placed in an eyeglass frame.

As shown in FIG. 10(b) of the accompanying drawings, if the positions where the lens L is pressed by the first side holder 44 and the second side holder 45 are lowered approximately to a horizontal line H passing through the center of the lens L, then thickness irregularities that are produced may be prevented from being positioned in the edged lens shape. However, because this lens holding arrangement holds the lens at three locations thereon, i.e., the left and right ends near the lens center and the lower lens end, the lens is not held stably and is liable to drop while a hard coating is being deposited on the lens, resulting in a reduction in the yield of lenses.

The present invention has been made under the above circumstances. It is a first object of the present invention to provide a lens holding jig which is capable of reducing, as much as possible, the generation of a lens appearance defect by side holders for holding left and right edges of a lens.

With the lens holding jig 500 shown in FIGS. 9(a) through 9(c), furthermore, the hard coating solution tends to gather on the lens near the lens edge contacted by the lower side holder 46. When the hard coating solution collects, it builds up and makes the resultant hard coating thick, developing an optical appearance defect.

Figure 11:
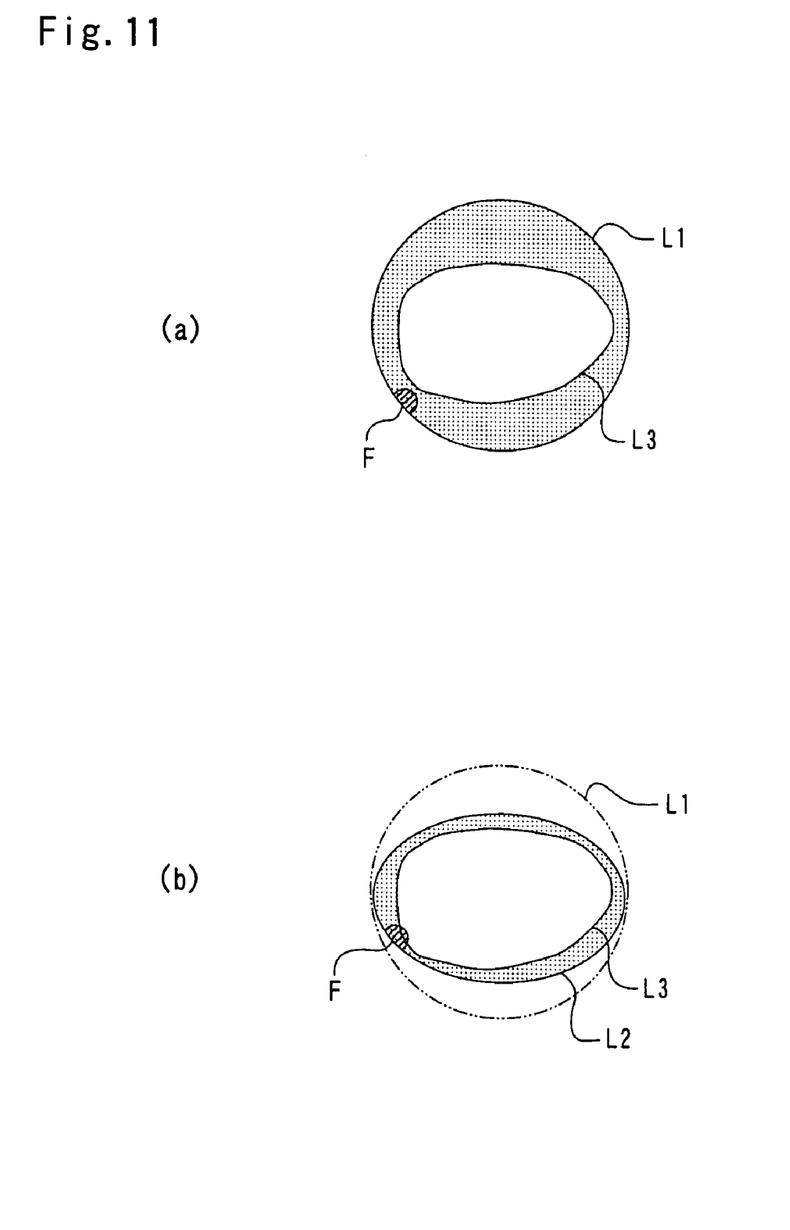
FIG. 11(a) is a view showing a circular lens and a edged lens shape.
FIG. 11(b) is a view showing a noncircular lens and an edged lens shape.

As shown in FIG. 11(a), if a edged lens shape L3 is taken from a circular lens L1 and set into an eyeglass frame, then since the distance between the edge of the lens L1 and the edged lens shape L3 is sufficiently large, a solution buildup F near the lens edge does not affect the edged lens shape L3 and causes almost no problems.

If a convex lens is to be thin in its entirety, as shown in FIG. 11(b), then the lens is ground to a reduced thickness within a range which does not affect the edged lens shape L3, producing a noncircular lens L2 such as an elliptical lens. However, since the distance between the edged lens shape L3 and the edge of the noncircular lens L2 is not sufficiently large, the solution buildup F near the lens edge may be positioned in the edged lens shape L3 and cause an appearance defect, tending to lower the yield of noncircular lenses L2.

The present invention has been made under the above circumstances. It is a second object of the present invention to provide a lens holding jig which is capable of reducing, as much as possible, the generation of a solution buildup at a lower side holder for holding a lower edge of a lens.

DISCLOSURE OF INVENTION

The inventor has made intensive studies to achieve the first object, and has found that the occurrence of a lens appearance defect can be reduced as much as possible by providing side holders for supporting left and right edges of a lens, each of the side holders having a V-shaped holder for holding the edge of the lens and a vertical extension supporting the V-shaped holder and extending downwardly from the V-shaped holder along the edge of the lens, the vertical extension being in contact with or highly close to the edge of the lens.

The vertical extension extending downwardly from the V-shaped holder along the edge of the lens is held in contact with or highly close to the edge of the lens, and serves as a path along which a solution flows downwardly. When the lens is pulled out of the solution after it has been dipped in the solution, the solution that has gathered on the V-shaped holder of the side holder flows down the vertical extension extending downwardly from the V-shaped holder, but does not flow down the surface of the lens, thereby preventing flow irregularities on the surface of the lens. Flow irregularities are also produced when a film of hard coating solution formed between the lens and the side holder bursts because the hard coating solution that has been formed the film is attracted to the lens, gathers on the surface of the film, and flows down with time. With the vertical extension that is in contact with against or highly close to the edge of the lens, since there is almost no gap between the lens and the side holder, a solution film is prevented from occurring.

A horizontal extension is also provided which supports the vertical extension and extends in a direction substantially parallel to the level of the solution. As the horizontal extension extends in a direction substantially normal to the edge of the lens, a solution film is less liable to be formed between the horizontal extension and the edge of the lens, and hence the hard coating solution does not tend to be applied to the lens due to the rupture of a solution film. Since the horizontal extension does not serve as a path for the hard coating solution, it prevents the hard coating solution from flowing to the lens and hence prevents flow irregularities from being formed on the surface of the lens.

If the V-shaped holder and the vertical extension of each of the side holders, and additionally the horizontal extension thereof are integrally formed of a bent wire, the amount of the treating solution that is applied to the side holders is reduced, making it possible to form a uniform treating film on the surface of the lens near the edges of the lens held in contact with the side holders.

The side holders can be used on a lens holding jig for mounting a number of lenses altogether or a single lens holding jig as described above.

To achieve the second object, the inventor has found that the gathering of a solution on a lens can be reduced as much as possible by providing a lower side holder for holding a lower edge of the lens, the lower side holder having a support plate extending vertically and having a recess defined in an upper end thereof for supporting the edge of the lens, and an auxiliary plate extending vertically and integrally combined with the support plate at a crossing angle.

The lower side holder allows the solution to drip off easily, and vertically extending corners where the support plate and the auxiliary plate cross each other at the crossing angle allow the solution to gather easily. The lower side holder which has the auxiliary plate mounted on the support plate has more solution retaining power than a lower side holder which has a support plate alone, and the solution film on the surface of the lens near the edge of the lens contacted by the lower side holder is attracted to the solution that has gathered at the corners, making it less liable for the solution to gather on the lens.

Inasmuch as the lower side holder is of a integral structure produced by bending a plate into the support plate and the auxiliary plate, the auxiliary plate can easily be mounted on the support plate.

The lower side holder can be used on a lens holding jig for mounting a number of lenses altogether or a single lens holding jig as described above.

BRIEF DESCRIPTION OF DRAWINGS

FIGS. 1(a) and 1(b) show an embodiment of a lens holding jig according to a first invention.

FIGS. 4(a) and 4(b) show an embodiment of a carrier jig.

FIGS. 5(a) and 5(b) show an embodiment of a lens holding jig according to a second invention.

FIGS. 8(a) and 8(b) show an embodiment of a lens holding jig according to the second invention for accommodating a number of lenses.

FIGS. 9(a) through 9(c) show a conventional single lens holding jig.

BEST MODE FOR CARRYING OUT THE INVENTION

Embodiments of lens holding jigs according to the present invention will be described below. However, the present invention is not limited to the embodiments described below.

A lens holding jig according to the present invention is used in a dipping process for forming a hard coating or the like on a lens having a thin edge or a lens having a sharp edge.

An embodiment of a lens holding jig according to a first invention, which has improved side holders, will be described below with reference to FIGS. 1(a) through 4(d). The lens holding jig is applied as a single lens holding jig.

FIGS. 1(a) and 1(b) show a lens holding jig according to the present invention which is holding a lens with its edge disposed vertically, i.e., which is holding a lens vertically: FIG. 1(a) is a front elevational view of the lens holding jig and FIG. 1(b) is a view showing a lens held by left and right side holders of the lens holding jig.

The lens holding jig 1 is made of stainless steel in its entirety, and has such a structure that a lens holder 2 for holding a lens L which is disposed vertically is connected to a carrier fixture 3 which supports the lens holding jig 1 as a whole and is removably mounted on a carrier jig.

Figure 4:
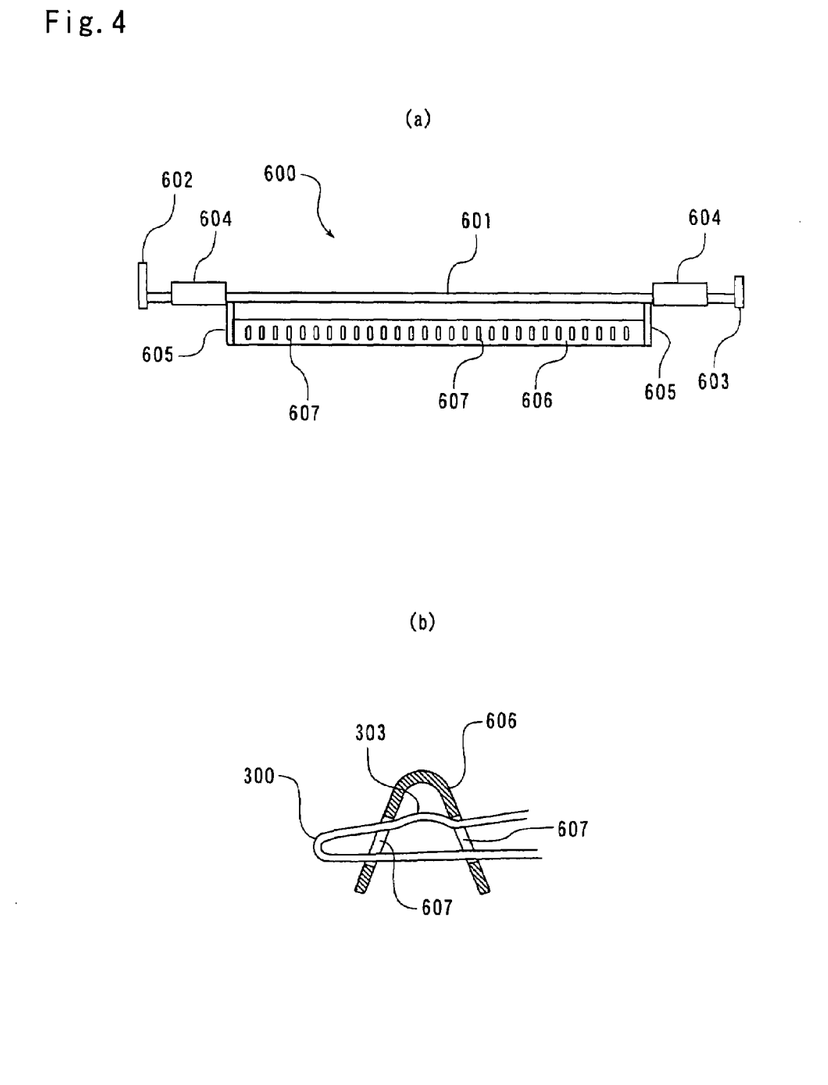
FIG. 4(a) is a side elevational view of the carrier jig and FIG. 4(b) is a cross-sectional view showing a spring inserted into a mount.

The carrier fixture 3 has a spring 300 that can fixedly be mounted on the carrier jig 600 shown in FIG. 4. The spring 300 comprises a metal wire having a circular cross section and bent at acute angles into a spring shape. The carrier fixture 3 has finger grips 301, 302 disposed on confronting tip ends and comprising circularly shaped metal wires, respectively. The spring 300 also includes a curved section 303 curved and projecting outwardly.

Figure 1:
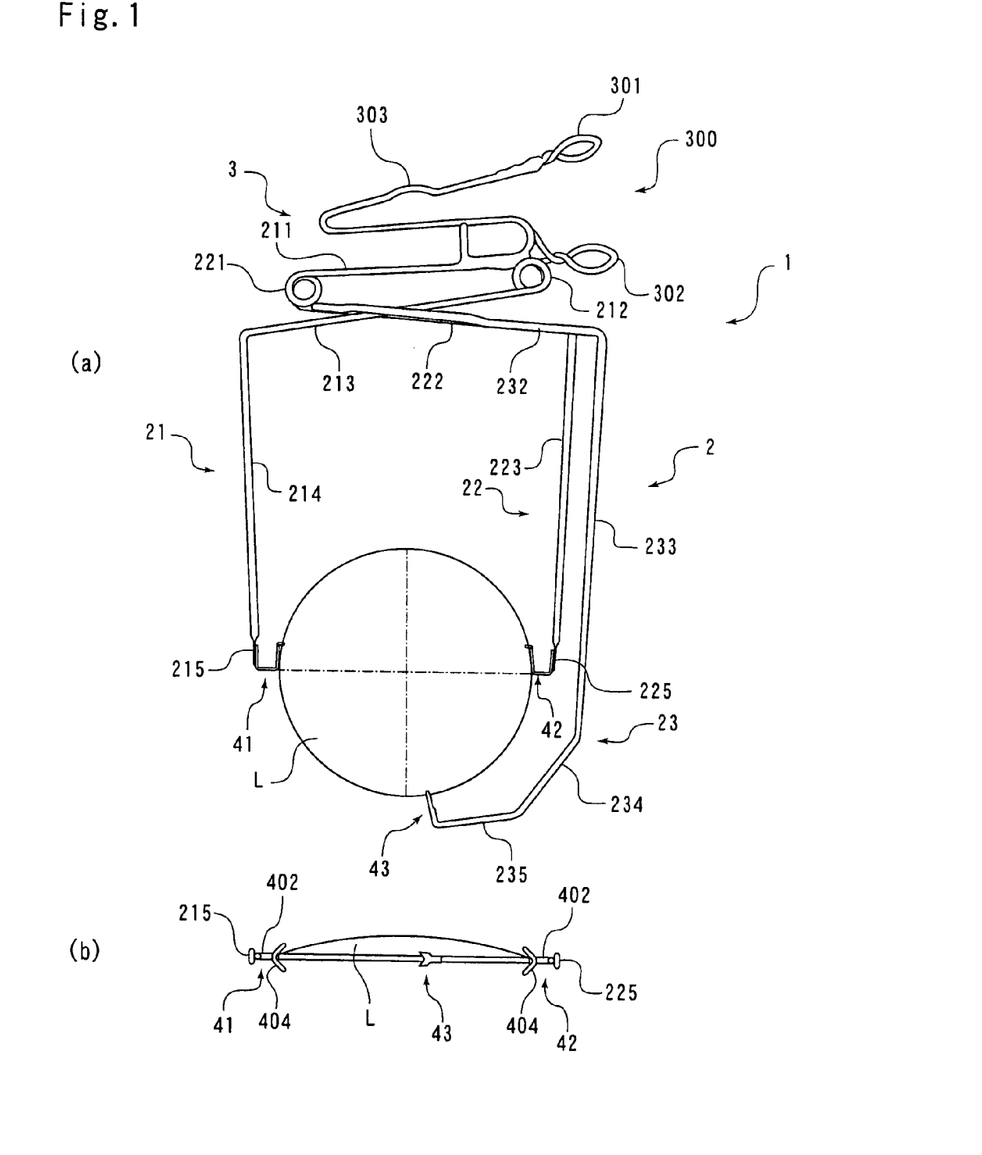
FIG. 1(a) is a front elevational view of the lens holding jig and FIG. 1(b) is a view showing a lens held by left and right side holders of the lens holding jig.
Figure 2:
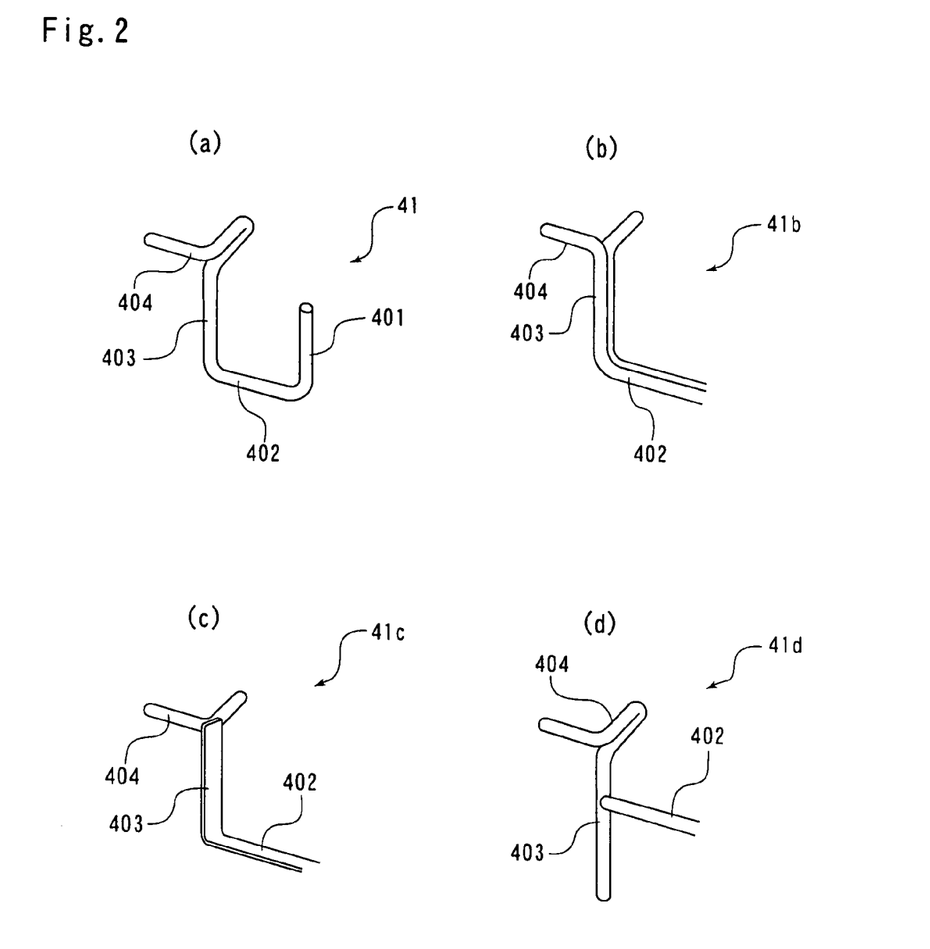
FIGS. 2(a) through 2(d) are perspective views of various forms of side holders.

The lens holder 2 is joined as by welding to the lower end of the spring 300 which can be extended and contracted vertically. The lens holder 2 has a first arm 21, a second arm 22, and a third arm 23, each having a free distal end. The first arm 21, the second arm 22, and the third arm 23 comprise metal wires that are basically circular in cross section. The metal wires that make up the first arm 21, the second arm 22, and the third arm 23 are of a small diameter in the range from 1.5 mm to 2.5 mm. In the lens holding jig 1 shown in FIG. 1, the first arm 21 and the second arm 22 are integrally formed of a single bent metal wire, and the third arm 23 is joined to the second arm 22.

The first arm 21 is bent back at an acute angle obliquely downwardly from the horizontal direction through a first coil spring 212 as a biasing means from an end of a horizontal arm 211 that is joined to the spring 300. A first inclined section 213 that is bent back obliquely to the left in FIG. 1 (in the specification, left and right are referred to with respect to the drawings) is bent slightly inwardly from the vertical direction slightly on the left side of a left end of the lens L, providing a first vertical section 214 extending obliquely slightly inwardly from the vertical direction. The first vertical section 214 has a distal end portion positioned near a central left edge of the lens L. The distal end portion of the first arm 21 is formed by a press or the like into a flat shape as an attachment 215, and a joint (described later on) of a first side holder 41 is joined to the attachment 215.

The second arm 22 is bent back at an acute angle obliquely downwardly from the horizontal direction through a second coil spring 221 as a biasing means from an end of the horizontal arm 211. A second inclined section 222 that is bent back obliquely to the right in FIG. 1 is bent slightly inwardly from the vertical direction slightly on the right side of a right end of the lens L, providing a second vertical section 223 extending obliquely slightly inwardly from the vertical direction. The second vertical section 223 has a distal end portion positioned near a central right edge of the lens L. As with the first arm 21, the distal end portion of the second arm 22 is formed by a press or the like into a flat shape as an attachment 225, and a joint (described later on) of a second side holder 42 is joined to the attachment 225.

The first side holder 41 and the second side holder 42 will be described in detail later on.

The third arm 23 has a third inclined section 232 extending parallel to the second inclined section 222 of the second arm 22 and joined to the second arm 21 near the second coil spring 221 and also to the distal end of the second inclined section 222 in spaced relation to the second inclined section 222 such that the third inclined section 232 and the second inclined section 222 sandwich the first inclined section 213 of the first arm 21 therebetween. The third inclined section 232 is bent vertically slightly outwardly from the second vertical section 223 of the second arm 22, providing a third vertical section 233 extending obliquely slightly inwardly from the vertical direction. The third vertical section 233 is bent at obliquely rightward and downward position of the lens L along the lens L, providing a fourth inclined section 234. The fourth inclined section 234 is bent at downward position of the lens L nearly horizontally along the edge of the lens L, providing a fifth inclined section 235. The fifth inclined section 235 has a distal end portion bent substantially vertically toward the center of the lens L and a distal end formed by a press or the like into a flat shape as a lower side holder 43 with a V-shaped recess defined therein. The lower side holder 43 is positioned on the lower edge of the lens L slightly closer to the second arm 22.

The first inclined section 213 of the first arm 21 is sandwiched between and extends across the second inclined section 222 of the second arm 22 and the third inclined section 232 of the third arm 23. Movement of the first arm 21 toward and away from the edge of the lens L is limited by the second inclined section 222 of the second arm 22 and the third inclined section 232 of the third arm 23, which serve as a guide, so that planar movement of the first arm 21 is substantially parallel to the edge of the lens L.

Structural details of the first side holder 41 and the second side holder 42 will be described below with reference to FIGS. 2(a) through 2(d). The first side holder 41 and the second side holder 42 are identical in shape to each other.

The first side holder 41 is shown at an enlarged scale in a perspective view illustrated in FIG. 2(a). The first side holder 41 shown in FIG. 2(a) is integrally formed in its entirety by bending a thin round rod of stainless steel. The first side holder 41 has: a joint 401 extending vertically and joined to the attachment 215 of the first arm 21; a horizontal extension 402 bent substantially at a right angle from the lower end of the joint 401 and extending substantially horizontally; a vertical extension 403 bent substantially vertically upwardly from the horizontal extension 402 along the lens edge; and a V-shaped holder 404 bent into a horizontal V shape from the upper end of the vertical extension 403.

Figure 3:
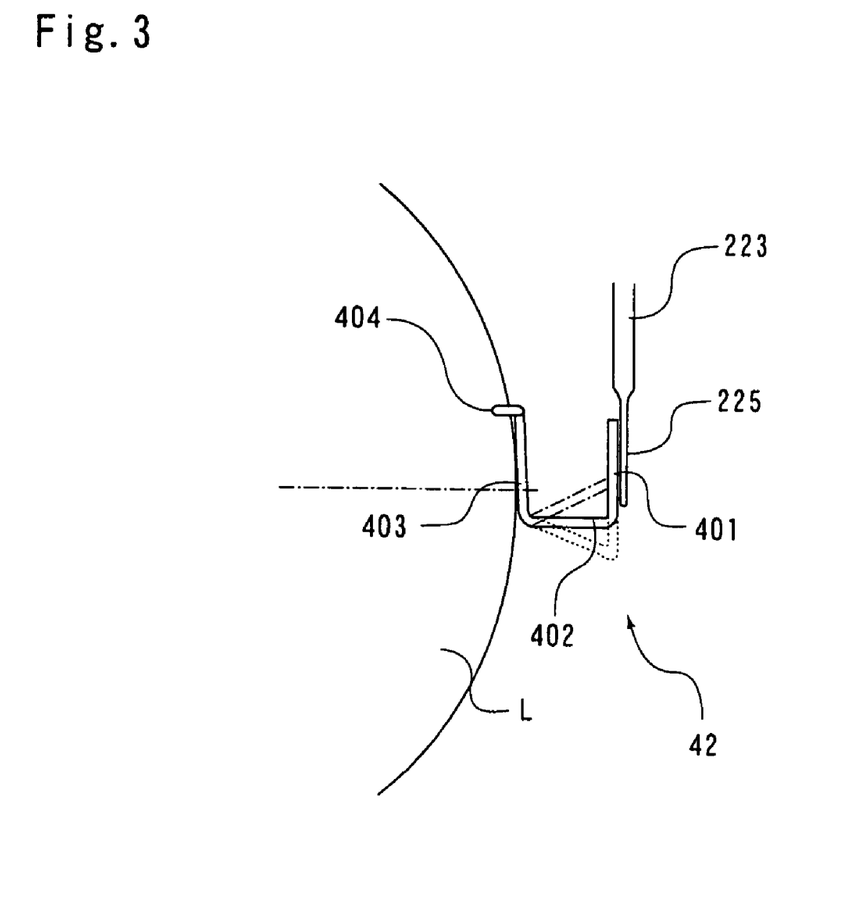
FIG. 3 is a side elevational view of a side holder at an enlarged scale.

The second side holder 42 is shown at an enlarged scale in a side elevational view illustrated in FIG. 3. The V-shaped holder 404 serves to hold a sharp edge such as a cutting edge or a thin end face of a vertically placed lens with a horizontal V-shaped groove. The V-shaped holder 404 is supported by the vertical extension 403 which extends downwardly from the V-shaped holder 404, and the vertical extension 403 is supported by the horizontal extension 402, which is supported by the joint 401. The vertical extension 403 which extends downwardly from the vertex of the V shape of the V-shaped holder 404 along the edge of the lens L is disposed in contact with or highly close to the edge face of the lens L.

The conventional lens holding jig 500 shown in FIG. 9 is free of the vertical extension 403 and the horizontal extension 402, which serve as characteristic elements of the lens holding jig 1 according to the first invention.

A method of using the lens holding jig 1 will be described below. For holding the lens L on the lens holding jig 1, the first inclined section 213 of the first arm 21 that obliquely crosses the second arm 22 is pulled by a finger toward the second coil spring 221 of the second arm 22, widely spreading the first arm 21. After the edge of the lens L is held in contact with the lower side holder 43 and the second side holder 42, the first side holder 41 on the distal end of the first arm 21 is brought into contact with the edge of the lens L under the bias of the coil spring 212.

As shown in FIG. 1(a), the lens L is held at three points, i.e., by the first holder 41, the second holder 42, and the third holder 43 because the first side holder 41 is pressed against a left side edge of the lens L which is slightly above the horizontal central line of the lens L, the second side holder 42 is pressed against a right side edge of the lens L which is slightly above the horizontal central line of the lens L, and the third holder 43 holds a lower side edge of the lens L slightly rightward from the vertical central line of the lens L.

Since the first arm 21 is bent at an acute angle through the first coil spring 212 and the second arm 22 is bent at an acute angle through the second coil spring 221, the first side holder 41 and the second side holder 42 have long strokes and is movable in a wide range. Therefore, the lens holding jig 1 is capable of holding lenses L having external diameters in a wide range, and is less liable to damage the lens L while the lens L is being mounted on the lens holding jig 1.

A plurality of lens holding jigs 1 are mounted on the carrier jig shown in FIGS. 4(a) and 4(b) by the respective carrier fixtures 3 mounted thereon. The carrier jig 600 has rectangular positioning plates 602, 603 integrally mounted horizontally on respective opposite ends of a main shank bar 601 perpendicularly to the axis of the main shank bar 601, and transfer plates 604 of V-shaped cross section integrally mounted on the main shank bar 601 in upwardly sandwiching relation thereto inwardly of the positioning plates 602, 603. The carrier jig 600 also has vertical hanger rods 605 integrally mounted on the main shank bar 601 inwardly of the transfer plates 604, and a mount 606 having an inverted V-shaped cross section as shown in FIG. 4(b) integrally mounted on the hanger rods 605 and extending substantially parallel to the main shank bar 601. The mount 606 has vertically slender insertion holes 607 as shown in FIG. 4(b) spaced at given intervals and penetrated horizontally opposite walls of the mount 606.

The upper and lower finger grips 301, 302 of the spring 300 of the carrier fixture 3 are gripped by a thumb and an index finger to compress the spring 300, and the distal end of the spring 300 is inserted into the insertion holes 607. Then, the upper and lower finger grips 301, 302 are released, allowing the curved section 303 of the spring 300 to be pressed against the upper ends of the insertion holes 607 defined in the opposite V-shaped walls. The spring 300 is now pressed against the upper and lower ends of the insertion holes 607 under the bias of the spring 300 which tends to expand vertically, and hence is mounted in the insertion holes 607. The mounted spring 300 does not wobble, is prevented from being dislodged, and is held stably in position. For removing the spring 300 from the mount 606, a force is applied to the spring 300 to reduce the distance between the finger grips 301, 302 against the bias of the spring 300, thus reducing the vertical width of the spring 300, whereupon the spring 300 can easily be removed from the insertion holes 607. The carrier fixture 3 is thus removably mounted on the carrier jig 600.

When the carrier fixtures 3 of a plurality of lens holding jigs 1 are mounted on and suspended from the mount 606 of the carrier jig 600, the lens holding jigs 1 can be carried altogether by the carrier jig 600. With the lens holding jigs 1 mounted on the carrier jig 600, the lenses L are dipped in a treating solution such as a hard coating solution or the like, and then pulled up after a predetermined period of time. After the treating solution has dripped off the lenses L, the lenses L are carried into a drying furnace in which the treating solution is dried off.

When the lens holding jig 1 is pulled out of the treating solution, the hard coating solution that is applied to the first arm 21, the second arm 22, the third arm 23, the first side holder 41, the second side holder 42, and the lower side holder 43 of the lens holding jig 1, and the lens L flows downwardly. Since the hard coating solution is of considerably high viscosity, it flows downwardly relatively slowly.

Since the vertical extensions 403 of the side holders 41, 42 are held in contact with or positioned closely to the edge and side surfaces of the lens L, the vertical extensions 403 serve as a path along which the solution flows. Gaps between the lens L and the side holders 41, 42, which would tend to produce a liquid film responsible for flow irregularities on the surface of the lens, are eliminated. Therefore, when the lens L is pulled out of the solution after being dipped therein, any solution that has gathered on the V-shaped holders 404 of the first side holder 41 and the second side holder 42 flows down the vertical extensions 403 integral with the V-shaped holders 404, and does not flow down the surface of the lens L. Because a film of the hard coating solution which would be formed between the lens L and the side holders 41, 42 and responsible for flow irregularities is eliminated, flow irregularities are less liable to be generated on the surface of the lens L.

The vertical extensions 403 thus function as a path for discharging the solution that has gathered on the V-shaped holders 404, and should preferably have a length of 2 mm or more. The vertical extensions 403 are not limited to a straight shape, but may be of an arcuate shape as with the edge of the lens L so that the vertical extensions 403 can be positioned as closely to the edge of the lens L.

As shown in FIG. 3, since the horizontal section 402 extends substantially parallel to the level of the solution, i.e., substantially horizontally, it does not serve as a path along which the solution flows and reduces as much as possible the formation of a film between itself and the edge of the lens L. As indicated by the dot-and-dash lines in FIG. 3, if the angle between the horizontal extension 402 and the vertical extension 403 is an acute angle, i.e., if the horizontal extension 402 extends upwardly from the horizontal line away from the lens L, the hard coating solution that has been applied to the first arm 21 and the second arm 22 tends to flow along the horizontal extension toward the lens L, causing an appearance defect. As indicated by the broken lines in FIG. 3, if the angle between the horizontal extension 402 and the vertical extension 403 is an obtuse angle, i.e., if the horizontal extension 402 extends downwardly from the horizontal line away from the lens L, a film of the hard coating solution tends to be formed between the horizontal extension 402 and the edge of the lens L, also causing an appearance defect. Therefore, the horizontal extension should desirably extend substantially horizontally.

As shown in FIG. 2(a), the V-shaped holder 404 and the vertical extension 403 of the first side holder 41 and the second side holder 42 should preferably be integrally formed with the horizontal extension 402 by bending a single wire. If the V-shaped holder 404 and the vertical extension 403 are separate from each other, then it is necessary to secure the V-shaped holder 404 and the vertical extension 403 to each other as by welding, and irregularities are liable to be formed in the junction. Those irregularities may possibly obstruct the flow of the solution. Furthermore, since the irregularities are not held in close contact with the edge face of the lens L, the vertical extension 403 may not be effective as a path along which the solution flows.

The first side holder 41 and the second side holder 42 are not limited to those shown in FIG. 2(a). A first side holder 41b shown in FIG. 2(b), for example, which is of a structure that is substantially the same as the structure shown in FIG. 2(a), comprises a pair of wires each bent into one protrusion of the V-shaped holder 404, the vertical extension 403, and the horizontal extension 402, and the joint 401 (not shown), with the vertical extensions 403, and the horizontal extensions 402, and the joints 401 being disposed parallel to each other, providing a simple structure of the V-shaped holder 404.

A first side holder 41c shown in FIG. 2(c) has a thin plate used as the vertical extension 403 and the horizontal extension 402. The V-shaped holder 404, which comprises a wire bent into a V shape, is joined to the upper end of the vertical extension 403 by a brazed continuous surface free of surface irregularities. Since the side holder 41c is made up of a thin plate, it provides a spring function for better close contact with the edge face of the lens L.

A side holder 41d shown in FIG. 2(d) comprises a single wire bent into the V-shaped holder 404 and the vertical extension 403, with the tip end of the horizontal holder 402 being joined to an intermediate portion of the vertical extension 403.

An actual lens was dipped into the hard coating solution using the lens holding jig 1 according to the present invention. As a result, it was confirmed that any appearance defects due to flow irregularities on the lens surface were greatly minimized, compared with the conventional lens holding jig 500 having the side holders 44, 45.

The lens holding jig 1 has a minimum surface area as the first arm 21, the second arm 22, and the third arm 23 are made of a metal wire having a circular cross section. Therefore, the amount of hard coating solution applied to the lens holding jig 1 is small, and any adhesion deposits on the lens holding jig 1 can easily be removed by cleaning, so that the lens holding jig 1 can easily be cleaned.

In the above description, the lower side holder is in the form of a conventional holder. However, it may comprise a lower side holder according to a second invention described below. Furthermore, the above side holders may be used as the side holders of the conventional lens holding jig for holding a number of lenses altogether.

An embodiment of a lens holding jig according to a second invention for achieving the second object will be described below with reference to FIGS. 5(a) through 7(d).

The lens holding jig 1b is made of stainless steel in its entirety, and is used to hold a sharp edge such as a cutting edge or a thin side edge of a noncircular lens L2. The lens holding jig 1b has such a structure that a lens holder 2b for holding a lens L2 which is disposed vertically is connected to a carrier fixture 3b which supports the lens holding jig 1 as a whole.

The carrier fixture 3b has a hook 30 that is removably mounted on and suspended from a horizontal bar (not shown) of a carrier jig (not shown), which horizontal bar have a rectangular cross section instead of the mount 606 of the carrier jig 600 shown in FIG. 4. The hook 30 is formed by bending a somewhat thick rectangular plate, and has a support 31 having an inverted recess shape to be fitted stably on upper and left and right side surfaces of a hook recess of a substantially rectangular shape that is defined in the horizontal bar of the carrier jig, and a horizontal plate 32 integrally formed with the support 31. The hook 30 supports the lens holding jig 1 as a whole.

The lens holder 2b has a first arm 21b, a second arm 22b, and a third arm 23b having respective proximal ends joined to the horizontal plate 32 and respective free distal ends. The first arm 21b, the second arm 22b, and the third arm 23b comprise metal wires that are basically circular in cross section. The metal wire that makes up the first arm 21b is of a small diameter in the range from 0.5 mm to 1.5 mm, and is ⅔ through ⅓ thinner than the second arm 22b and the third arm 23b.

Figure 5:
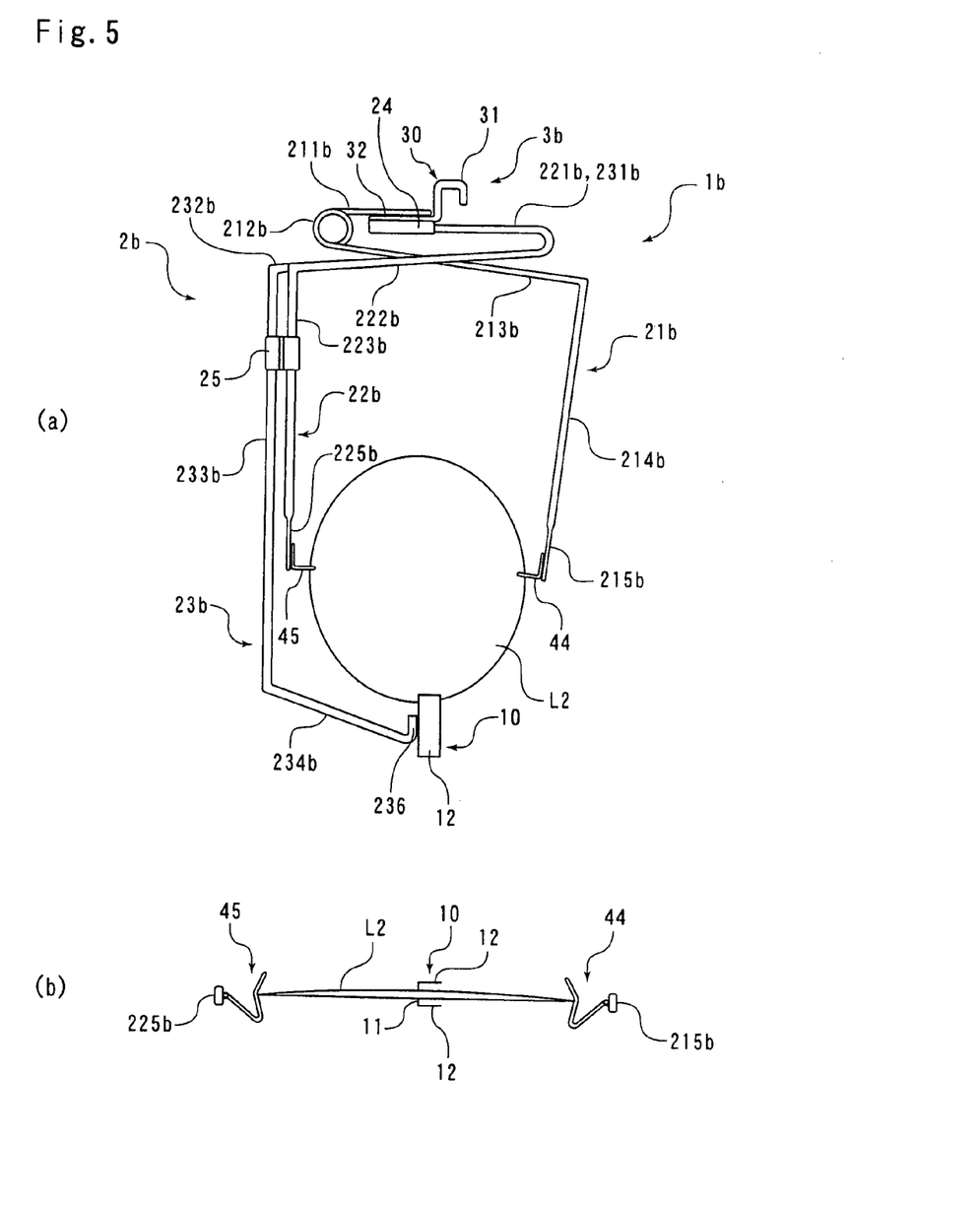
FIG. 5(a) is a front elevational view of the lens holding jig and FIG. 5(b) is a view showing a lens held by left and right side holders and a lower holder of the lens holding jig.

The proximal end of the first arm 21b is joined to the upper surface of the horizontal plate 32 of the hook 30 parallel thereto. The first arm 21b is bent back at an acute angle obliquely downwardly from the horizontal direction through a coil spring 212b as a biasing means from a first horizontal section 211b which extends horizontally from the proximal end. A first inclined section 213b which is bent back and inclined obliquely to the right in FIG. 5 is bent slightly inwardly from the vertical direction slightly on the right side of a right end of the lens L2, providing a first vertical section 214b extending obliquely slightly inwardly from the vertical direction. The first vertical section 214b has a distal end portion positioned near a central right edge of the lens L2. The distal end portion of the first arm 21b is formed by a press or the like into a flat shape as an attachment 215b, and the proximal end portion of a first side holder 44 comprising a bent wire is joined to the attachment 215b. A portion rising from the proximal end portion of the first side holder 44 is positionally nearly at the distal end of the first arm 21b.

The second arm 22b and the third arm 23b have respective proximal end portions joined to the lower surface of the horizontal plate 32 of the hook 30 by a guide plate 24 which has a ω-shaped cross section. The second arm 22b and the third arm 23b have respective first horizontal sections 221b, 231b extending horizontally to the right from the proximal end portions in opposite relation to the first arm 21b. The second arm 22b and the third arm 23b have respective second inclined sections 222b, 232b bent at an acute angle obliquely downwardly to the left from the respective first horizontal sections 221b, 231b and extending across the first arm 21b in sandwiching relation to the first inclined section 213b. The second inclined sections 222b, 232b are bent slightly inwardly from the vertical direction slightly on the left side of a left end of the lens L2, providing respective second vertical sections 223b, 233b extending obliquely slightly inwardly from the vertical direction.

The second vertical section 223b of the second arm 22b has a distal end extending so as to be positioned near a central left edge of the lens L2. The distal end portion of the second vertical section 223b of the second arm 22b is formed by a press or the like into a flat shape as an attachment 225b, and the proximal end portion of a second side holder 45 comprising a bent wire is joined to the attachment 225b. A portion rising from the proximal end portion of the second side holder 45 is positionally nearly at the distal end of the second arm 22b.

The second vertical section 233b of the third arm 23b is further bent obliquely at leftward and downward position of the lens L2 along the edge of the lens L, providing a third inclined section 234b. The third inclined section 234b is bent nearly vertically toward the center of the lens L2, providing an attachment 236. The attachment 236 on the distal end of the third arm 23b is positioned at the lower edge of the lens L2 slightly closely to the first arm 21b. A lower side holder 10 is joined to the attachment 236 of the third arm 23b. The lower side holder 10 will be described in detail hereinafter.

The second vertical sections 223b, 233b of the second arm 22b and the third arm 23b have respective upper portions fixed to each other by a joint plate 25 such that the second vertical sections 223b, 233b of the second arm 22b and the third arm 23b position substantially parallel to the edge of the lens L2. The first arm 21b, the second arm 22b, and the third arm 23b are bent substantially parallel to the edge of the lens L2 that is disposed vertically.

The first side holder 44 and the second side holder 45 which are mounted on the lens holding jig 1b according to the first embodiment comprise wires bent to form V-shaped recesses for holding a sharp edge such as a cutting edge or a thin side edge of the lens L2 on each of left and right sides thereof.

The lower holder 10 serves as a characteristic element of the lens holding jig 1b according to the second invention. The lower holder 10 is shown at an enlarged scale in a perspective view illustrated in FIG. 7(a). The lower holder 10 has a rectangular support plate 11 having a long side extending in the vertical direction, and the support plate 11 has a V-shaped recess 110 defined in an upper end thereof for supporting a side face or a sharp edge of a lens. The support plate 11 is joined to the attachment 236. Two rectangular auxiliary plates 12 which are substantially of the same length and the same width as the support plate 11 have longer sides extending vertically integrally joined to opposite edges of the support plate 11 and shorter sides perpendicularly to the support plate 11 remotely from the attachment 236. The support plate 11 and the auxiliary plates 12 on both sides thereof have a channel-shaped horizontal cross section. The support plate 11 and the auxiliary plates 12 are integrally formed by bending a plate. The support plate 11 and the auxiliary plates 12 are made of a thin stainless steel sheet.

For holding the lens L2 on the lens holding jig 1b, the first inclined section 213b of the first arm 21b that obliquely crosses the second arm 22b is pulled by a finger toward the first horizontal section 221b of the second arm 22b, widely spreading the first arm 21b. After the edge of the lens L2 is held in contact with the lower side holder 10 and the second side holder 45, the first side holder 44 of the first arm 21b is brought into contact with the edge of the lens L2 under the bias of the coil spring 212b.

Then, the hook 30 of the lens holding jig 1 is placed on and suspended from the horizontal bar of the carrier jig (not shown), and a plurality of lens holding jigs 1 are suspended. The lenses L2 are dipped in a treating solution such as a hard coating solution or the like, and then pulled up after a predetermined period of time. After the treating solution has dripped off the lenses L2, the lens holding jig is carried into a drying furnace in which the treating solution is dried off.

Since the first arm 21b is bent at an acute angle through the coil spring 212b, the first side holder 44 has a long stroke and is movable in a wide range. Therefore, the lens holding jig 1b is capable of holding lenses L having external diameters in a wide range, and is less liable to damage the lens L2 while the lens L2 is being mounted on the lens holding jig 1b.

The lens holding jig 1b is of a structure suitable for holding the noncircular lens L2 in particular. The noncircular lens is a thin lens whose overall thickness is reduced to meet the customer's demand for lenses with a reduced thickness (central thickness). Convex lenses (lenses in the + range) occasionally have a thin outer circumferential portion, which may be ground off to produce elliptical or noncircular lenses. The noncircular lens L2 whose outer circumferential portion has been ground off has a sharply pointed edge like a cutting edge, and may possibly be deformed when heated while it is clamped under strong forces from opposite sides thereof.

Since the diameter of the first arm 21b is smaller than those of the second arm 22b and the third arm 23b, the lens holding jig 1b applies a reduced spring pressure and is capable of holding the noncircular lens L2 with the thinner outer circumferential edge without deforming the noncircular lens L2.

The lower holder 10 is of such a structure that the auxiliary plates 12 are disposed on the opposite edges of the support plate 11. The lower holder 10 thus constructed has no structural components for preventing the solution from flowing downwardly, and allows the solution to drip off neatly after the lens has been dipped. However, the solution tends to gather at vertically extending corners where the support plate 11 and the auxiliary plates 12 cross each other perpendicularly. Therefore, the lower side holder 10 which has the auxiliary plates 12 mounted on the support plate 11 has more solution retaining power than the lower side holder 46 which has the support plate alone, and the solution film on the surface of the end of the lens L2 contacted by the lower side holder 10 is attracted to the solution that has gathered at the corners, making it less liable for the solution to gather on the lens L2. When a noncircular lens was dipped in the hard coating solution, it was confirmed that an appearance defect caused by the solution gathering on the lens L2 was much smaller than if the conventional lens holding jig 500 having the lower side holder 46 having the support plate alone was used.

Inasmuch as the lower side holder 10 is of an integral structure produced by bending a plate into the support plate 11 and the auxiliary plates 12, the auxiliary plates 12 can easily be mounted on the support plate 11. The auxiliary plates 12 also have a function to reinforce the support plate 11 in the form of a thin plate, making the support plate 11 resistant to bending.

The lower side holder 10 is not limited to the one shown in FIG. 7(a). A lower side holder 10b shown in FIG. 7(b), for example, which is of a structure that is substantially the same as the structure shown in FIG. 7(a), comprises auxiliary plates 12b longer than a support plate 11 and having lower portions projecting downwardly from the support plate 11b.

A lower side holder 10c shown in FIG. 7(c) has a rectangular support plate 11c having longer sides extending vertically and two rectangular auxiliary plates 12c having respective transversely central regions joined to opposite edges of the support plate 11c. The support plate 11c and the auxiliary plates 12c are combined to provide a substantially H-shaped horizontal cross section. Since the lower side holder 10c has four corners where the support plate 11c and the auxiliary plates 12c cross each other, the lower side holder 10c has greater solution retaining power than the lower side holder 10 shown in FIG. 7(a) and is highly effective to prevent the solution from gathering on the lens.

A lower side holder 10d shown in FIG. 7(d), which is of a basic structure that is substantially the same as the structure shown in FIG. 7(a), has a structure including a plurality of parallel zigzag bends extending the full length in the vertical direction of auxiliary plates 12d. In addition to corners where the support plate 11d and the auxiliary plates 12d cross each other, vertical grooves of the auxiliary plates 12d also retain the solution. Accordingly, the lower side holder 10d has greater solution retaining power and is highly effective to prevent the solution from gathering on the lens.

The lower side holder is not limited to those shown in FIGS. 7(a) through 7(d), but may have a number of fin-like auxiliary plates or may have support and auxiliary plates combined into a quadrangular tube. Since corners where the support plate 11 and the auxiliary plates 12 cross each other may be formed, the angle at which the support plate 11 and the auxiliary plates 12 cross each other is not limited to 90°.

The first inclined section 213b of the first arm 21b of the lens holding jig 1b is sandwiched between and extends across the second inclined section 222b of the second arm 22b and the third inclined section 232b of the third arm 23b. Therefore, movement of the first arm 21b toward and away from the edge of the lens L2 is limited by the second inclined section 222b of the second arm 22b and the third inclined section 232b of the third arm 23b, which serve as a guide, so that planar movement of the first arm 21b is substantially parallel to the edge of the lens L2.

The lens holding jig 1b has a minimum surface area as the first arm 21b, the second arm 22b, and the third arm 23b are made of a metal wire having a circular cross section. Therefore, the amount of hard coating solution applied to the lens holding jig 1b is small, and any adhesion deposits on the lens holding jig 1b can easily be removed by cleaning, so that the lens holding jig 1b can easily be cleaned.

Figure 6:
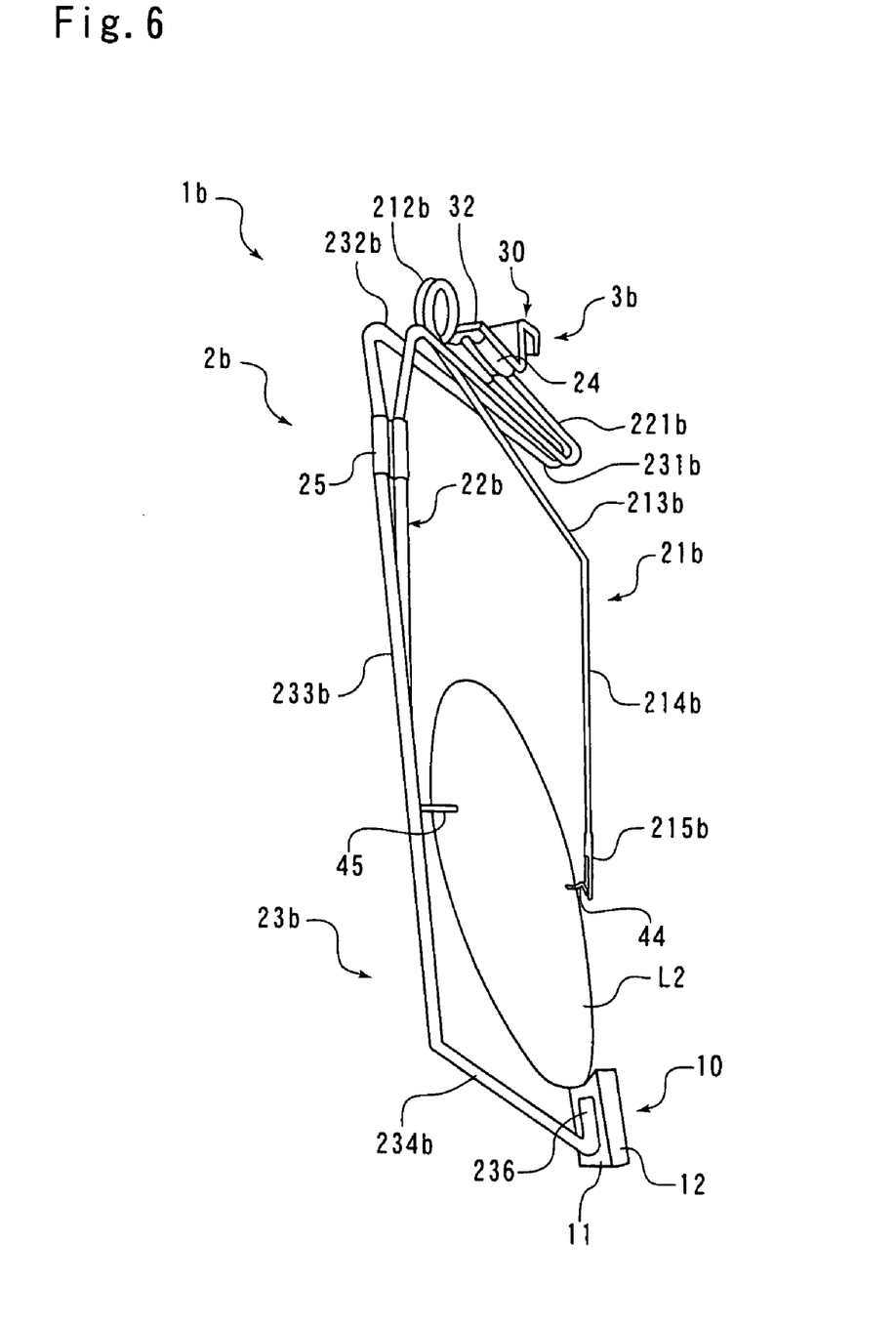
FIG. 6 is a perspective view of the lens holding jig illustrated in FIGS. 5(a) and 5(b), as viewed obliquely from below.
Figure 7:
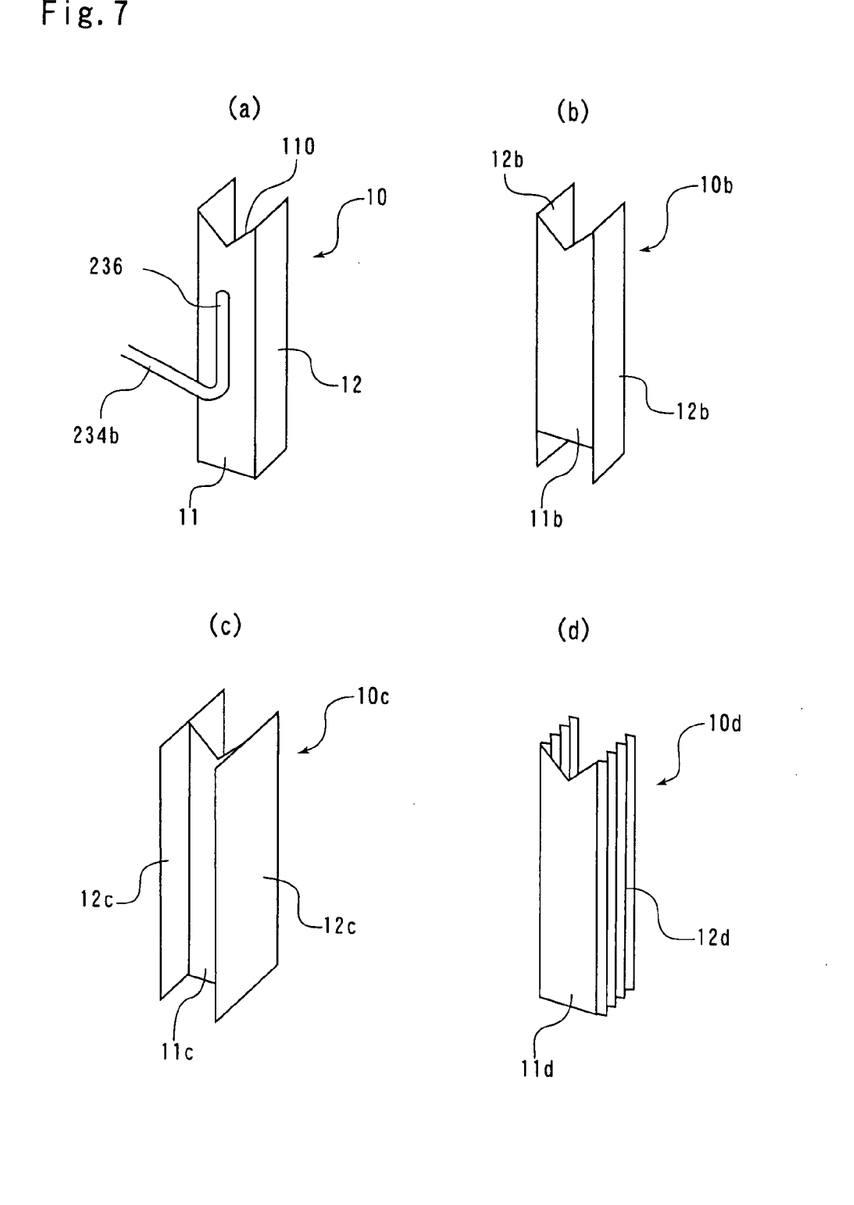
FIGS. 7(a) through 7(d) are perspective views of various forms of lower side holders.

The first and second side holders 44, 45 of the lens holding jig 1b shown in FIGS. 5 and 6 are in the form of a conventional holder. However, they may comprise the side holders 41, 42 according to the first invention. Furthermore, the lens holding jig 1b has been described above as being used to hold the noncircular lens L2, but may be used to hold a circular lens.

Figure 8:
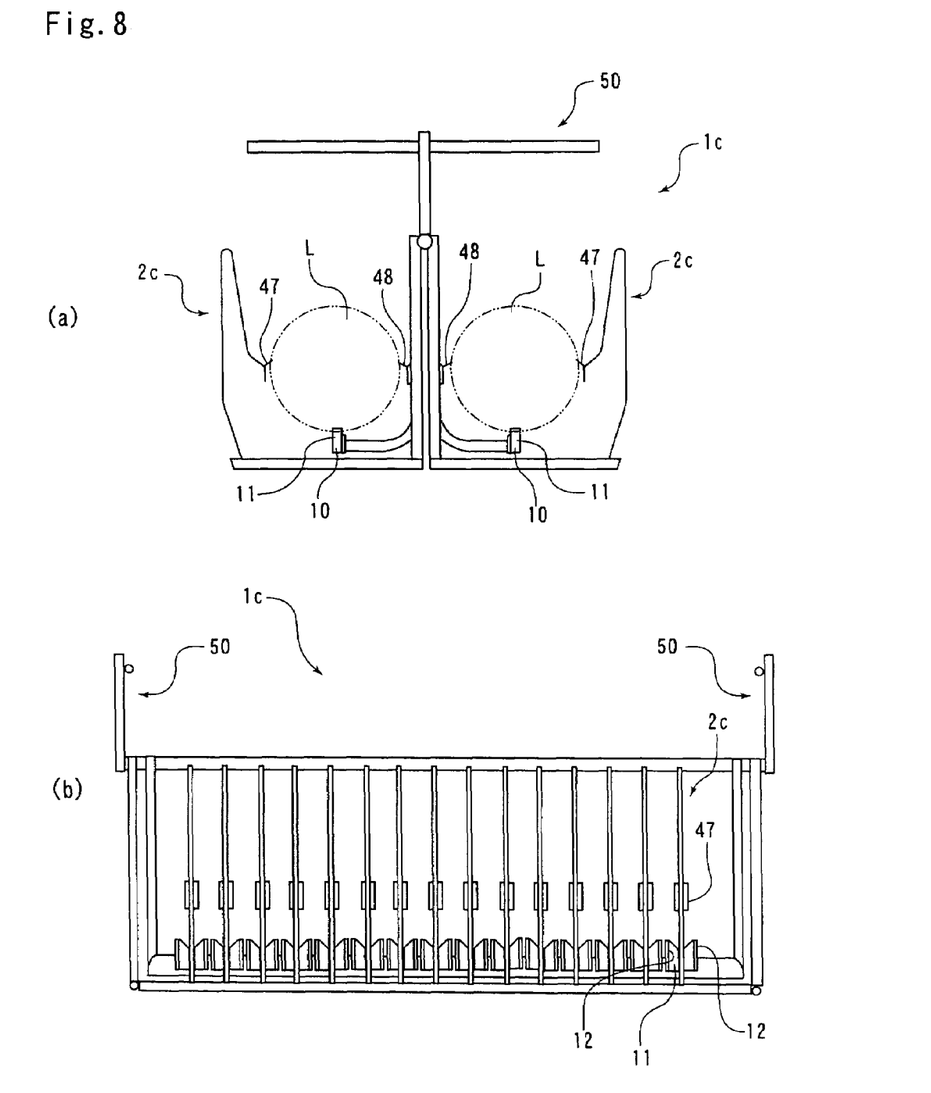
FIG. 8(a) is a front elevational view of the lens holding jig and FIG. 8(b) is a side elevational view of the lens holding jig.

Another embodiment of the lens holding jig according to the second invention will be described below with reference to FIGS. 8(a) and 8(b).

The lens holding jig 1c has two arrays of 15 successive lens holders 2c for holding circular lenses L in a vertical orientation, and can hold and dip a total of 30 lenses altogether. Each of the lens holders 2c holds a lens L with three holders, i.e., left and right side holders 47, 48 and a lower side holder 10. The outer side holders 47 are in the form of leaf springs. The lens holders 2c are arranged at a pitch representing equal intervals depending on the thickness of the lens L. The lens holding jigs 2c are integrally combined with a carrier jig 50 for carrying the lens holding jigs 2c.

The left and right side holders 47, 48 of the lens holding jig 1c comprise a support plate 46 having a V-shaped recess for holding a thin side edge of the lens, as shown in FIG. 9(c). However, the left and right side holders 47, 48 may comprise the side holders 41, 42 according to the first invention, as shown in FIG. 1.

The lower side holder 10 is of the structure shown in FIG. 7(a). The lower side holder 10 may be of any one of the structures shown in FIGS. 7(b) through 7(d), or of another structure.

As shown in FIG. 7(a), the lower side holder 10 has the support plate 11 having the recess 110 defined in the upper end thereof for supporting the edge of the lens L and extending vertically, and the auxiliary plates 12 extending vertically and integrally formed with the support plate 11 at a crossing angle. Since corners where the support plate 11 and the auxiliary plates 12 cross each other are effective to retain the solution, the lower side holder 10 is effective to prevent the solution from gathering on the lens after the lens is dipped in the treating solution.

In the above description, a hard coating film is formed on a plastic lens by the dipping process. However, the treating solution is not limited to the hard coating solution.

INDUSTRIAL APPLICABILITY

The lens holding jig according to the present invention can be used to hold a plastic eyeglass lens, for example, when the lens is treated in the dipping process for forming a hard coating film for making the lens resistant to scratches. The lens holding jig can be used to produce plastic spectacle lenses.

The invention claimed is:

1. A lens holding jig for holding a lens whose edge is disposed vertically with at least three holders including side holders which hold left and right edges of the lens and a lower side holder for holding a lower edge of the lens, and dipping the lens in a solution, characterized in that:

at least one of said side holders has a V-shaped holder for holding the edge of said lens and a vertical extension supporting said V-shaped holder and extending downwardly from said V-shaped holder along the edge of said lens, said vertical extension being in contact with or highly close to the edge of said lens.

2. The lens holding jig according to claim 1, characterized in that:

said at least one of said side holders has a horizontal extension supporting said vertical extension and extending in a direction substantially parallel to the level of the solution.

3. The lens holding jig according to claim 2, characterized in that:

said horizontal extension, said V-shaped holder, and said vertical extension are integrally formed of a bent wire.

4. The lens holding jig according to claim 1, characterized in that:

said V-shaped holder and said vertical extension are integrally formed of a bent wire.

5. The lens holding jig according to claim 1, characterized by:

a carrier fixture mounted on a carrier jig, and a single lens holder for supporting and holding the edges of said single lens with said holders which are mounted respectively on a plurality of arms joined to said carrier fixture.

6. The lens holding jig according to claim 5, characterized in that:

said lens holder has a first arm bent at an acute angle through a coil spring and having on a distal end thereof a first side holder biased into contact with the edge of said lens by said coil spring, a second arm having a second side holder for contact with the edge of said lens which is opposite to the edge thereof that is engaged by said first side holder, and a third arm having the lower side holder for contact with the lower edge of said lens between the edge of said lens which is engaged by said first side holder and the edge of said lens which is engaged by said second side holder.

7. A lens holding jig for holding a lens whose edge is disposed vertically with at least three holders including side holders which hold left and right edges of the lens and a lower side holder for holding a lower edge of the lens, and dipping the lens in a solution, characterized in that:

said lower side holder has a support plate extending vertically and having a recess defined in an upper end thereof for supporting the edge of said lens, and an auxiliary plate extending vertically and integrally combined with said support plate at a crossing angle.

8. The lens holding jig according to claim 7, characterized in that:

said support plate and said auxiliary plate are integrally formed of a bent plate.

9. The lens holding jig according to claim 7, characterized by:

a carrier fixture mounted on a carrier jig, and a single lens holder for supporting and holding the edges of said single lens with said holders which are mounted respectively on a plurality of arms joined to said carrier fixture.

10. The lens holding jig according to claim 9, characterized in that:

said lens holder has a first arm bent at an acute angle through a coil spring and having on a distal end thereof a first side holder biased into contact with the edge of said lens by said coil spring, a second arm having a second side holder for contact with the edge of said lens which is opposite to the edge thereof that is engaged by said first side holder, and a third arm having the lower side holder for contact with the lower edge of said lens between the edge of said lens which is engaged by said first side holder and the edge of said lens which is engaged by said second side holder.

* * * * *